United States Patent
Müller et al.

(10) Patent No.: US 11,408,402 B2
(45) Date of Patent: Aug. 9, 2022

(54) SHAPE-MEMORY ACTUATOR ASSEMBLY AND ASSEMBLY METHOD

(71) Applicant: Chr. Mayr GmbH + CO. KG, Mauerstetten (DE)

(72) Inventors: Alexander Müller, Kaufbeuren (DE); Martin Reichle, Kirchheim (DE); Martin Kastl, Lamerdingen (DE)

(73) Assignee: CHR. MAYR GMBH+CO. KG, Mauerstetten (DE)

( * ) Notice: Subject to any disclaimer, the term of this patent is extended or adjusted under 35 U.S.C. 154(b) by 0 days.

(21) Appl. No.: 17/421,187

(22) PCT Filed: Dec. 28, 2019

(86) PCT No.: PCT/DE2019/101113
§ 371 (c)(1),
(2) Date: Jul. 7, 2021

(87) PCT Pub. No.: WO2020/143869
PCT Pub. Date: Jul. 16, 2020

(65) Prior Publication Data
US 2022/0056895 A1 Feb. 24, 2022

(30) Foreign Application Priority Data
Jan. 11, 2019 (DE) .................. 10 2019 100 694.5

(51) Int. Cl.
*F03G 7/06* (2006.01)
(52) U.S. Cl.
CPC ....... *F03G 7/06143* (2021.08); *F03G 7/0612* (2021.08); *F03G 7/0615* (2021.08); *F03G 7/0616* (2021.08)

(58) Field of Classification Search
CPC .. F03G 7/06143; F03G 7/0612; F03G 7/0615; F03G 7/0616; F03G 7/065
(Continued)

(56) References Cited

U.S. PATENT DOCUMENTS

| 5,186,420 A | 2/1993 | Beauchamp et al. |
| 2001/0038082 A1 | 11/2001 | Hines et al. |

(Continued)

FOREIGN PATENT DOCUMENTS

| DE | 4307593 C1 | 8/1994 |
| DE | 19529712 A1 | 2/1997 |

(Continued)

OTHER PUBLICATIONS

International Search Report dated Jul. 16, 2020 in parent International application PCT/DE2019/101113.
(Continued)

*Primary Examiner* — Hoang M Nguyen
(74) *Attorney, Agent, or Firm* — Polson Intellectual Property Law, PC; Margaret Polson

(57) ABSTRACT

A shape-memory actuator assembly, comprising a shape memory wire element; a first deflection body and a second deflection body, spaced apart from each other, wherein the shape memory wire element is wound around the first deflection body and the second deflection body several times and provides an actuator arrangement located between them. At least one wire holder on the respective deflection body and sections of the shape memory wire element, contacting the wire holder, are embedded in a casting compound.

20 Claims, 4 Drawing Sheets

(58) Field of Classification Search
USPC .............................. 60/527–529; 310/306–307
See application file for complete search history.

(56) References Cited

U.S. PATENT DOCUMENTS

| | | | |
|---|---|---|---|
| 2004/0261411 A1 | 12/2004 | NacGregor | |
| 2008/0018198 A1* | 1/2008 | Sohn ..................... | F03G 7/065 310/307 |
| 2011/0102917 A1* | 5/2011 | Noda ..................... | G02B 7/08 60/527 |
| 2012/0017583 A1* | 1/2012 | Lewis ..................... | F03G 7/06 60/529 |
| 2012/0198835 A1* | 8/2012 | Skurkis .................. | F03G 7/065 60/527 |
| 2014/0298794 A1* | 10/2014 | Flaschentrager ......... | F03G 7/06 60/527 |

FOREIGN PATENT DOCUMENTS

| | | | |
|---|---|---|---|
| DE | 19730383 | A1 | 1/1999 |
| DE | 29918467 | U1 | 5/2000 |
| DE | 10205760 | A1 | 8/2003 |
| DE | 102012202401 | A1 | 10/2012 |
| DE | 102011112965 | A1 | 3/2013 |
| DE | 102011112966 | A1 | 3/2013 |
| EP | 0364869 | A2 | 4/1990 |
| EP | 1557563 | A1 | 7/2005 |
| EP | 1850359 | A2 | 10/2007 |
| WO | 2005033537 | A1 | 4/2005 |
| WO | 2005050409 | A2 | 6/2005 |
| WO | 2008112242 | A2 | 9/2008 |
| WO | 2011066224 | A2 | 6/2011 |

OTHER PUBLICATIONS

Written Opinion of the International Searching Authority dated Jul. 16, 2020 in parent International application PCT/DE2019/101113. Translation should be provided by WIPO.

Office Action dated Jan. 26, 2021 in related German application 10 2019 100 694.5. Google Translate English translation provided.

* cited by examiner

SHAPE-MEMORY ACTUATOR ASSEMBLY AND ASSEMBLY METHOD

BACKGROUND

The present disclosure concerns a shape-memory actuator assembly and an assembly method for the manufacturing of a shape-memory actuator assembly.

Actuators with shape-memory materials having a high temperature phase (austenite) and a low temperature phase (martensite) are known and are characterised by high strength as well as a high number of load cycles. Nickel-titanium alloys and nickel-titanium-copper alloys are typically used as materials for shape memory actuators. Furthermore, shape memory materials based on CuZn, CuZnAl, CuAlNi, TiNiAl, FeMnSi and ZnAuCu as well as shape memory polymers are known.

To activate a shape memory actuator, it must be heated above the phase transition temperature. This can be done by supplying a heat medium. Alternatively, the temperature change can be achieved by applying electric current. The control of a homogeneous temperature of the material is essential, therefore, typically thin-walled, elongated structures, such as wires or ribbons made of shape memory material, are used. Due to their high surface-to-volume ratio, they feature an advantageous rapid cooling, such that a temperature cycle may be executed rapidly and thus actuator positioning movements can be carried out in quick succession.

To exploit the advantages of wires or ribbons made of shape memory material for applications requiring higher actuating forces, the application of braids or fabrics made of shape memory wires is known. For this purpose, an exemplary reference is made to DE 4307593 C1. Furthermore, DE 102011112966 A1 and DE 102011112965 A1 propose the production of a grid structure in the form of meshes or woven fabrics made of a shape memory wire to achieve a combined actuator. Furthermore, the incorporation of shape memory materials into functional textiles or generally stretchable materials is known. Exemplary reference is made to EP 1850359 B1, EP 0364869 B1, EP 1644564 B1, WO 20050409 A2, EP 2136858 B1 and WO 2011066224 A2.

For shape memory actuators, embedding the shape memory material in a knitted, woven or composite fabric leads to a reduction in the force density and a decrease in the number of possible load cycles. This disadvantage also arises for the shape memory actuators described above, which are meshed or in the form of grids comprising individual wires. For these, the additional difficulty arises in case of activation by electric current that, when using thermally advantageous, non-electrically insulated shape memory alloys, a large number of electrical connection points occur at the nodes, leading to an undefined current flow and thus, under certain circumstances, to inhomogeneous heating of the entire shape memory actuator. Therefore, for shape-memory actuator assemblies, several actuators made of a shape memory material running in parallel and without mechanical contact to each other are preferred. Exemplary reference is made to U.S. Pat. No. 5,186,420 A and EP 1557563 A1. Furthermore, for such an arrangement with several actuators running in parallel DE 19529712 C2 proposes to use a one-piece shape memory element in the form of a wire, which is wound several times around at least two deflection bodies. In this case, the deflection bodies have a groove arrangement at the areas provided for contact with the wire, wherein the assembly requires precise winding with sufficient tensioning of the wire. Correspondingly, DE 19730383 B4 discloses helical guide grooves on a cylindrical deflection body, which enable parallel guidance of the actuators in the subsequent non-contacting section by means of an axial offset when winding around the deflection body. Such form-fitted receptacles on the deflection body require precise wire guidance during assembly, which could be achieved by time-consuming manual work only.

Furthermore, the above-mentioned DE 19730383 B4 suggests that the arrangement of deflection body and shape memory wire forms a one-piece part that can be handled as a unit, allowing the shape memory wire to be trained with respect to the intended use. However, the form-fitting and half-open wire receptacles on the deflection bodies require that an outwardly directed force is constantly maintained on the deflection bodies for permanently tensioning the shape memory wire. This requires an additional pull element, which increases the complexity and handling effort of the assembly.

Crimp connections are typically used for secure mechanical and electrical contacting of shape memory actuator wires. As an alternative, DE 29918467 U1 proposes for nickel-titanium shape memory actuator wires to apply a copper layer to the wire ends by electrochemical plating and to join them by soldering to a wire mount made of copper. DE 29918467 U1 describes another material-to-material contact method. By means of laser welding, connection points made of brass are created at the ends of a nickel-titanium shape memory actuator wire, wherein the thermal stress of the wire can be kept local such that the shape memory effect is maintained over a substantial part of the wire length. Furthermore, DE 10205760 A1 describes the manufacturing of wire end connections for metallic shape memory elements using a plastic with a high thermal and electrical conductivity. For the assembly of an arrangement with several parallel actuators, a spatially precise attachment of a high number of shape memory actuator wires of matching length to a mount, suitable for transmitting the actuator forces, is necessary, so that the aforementioned wire end connections lead to a high assembly effort.

SUMMARY

An aspect of the present disclosure is to provide a shape-memory actuator assembly with a plurality of non-contacting actuating elements arranged in parallel, which forms a compact device, providing high actuator forces, that can be handled as a unit. Furthermore, an assembly method for the manufacturing of such a shape-memory actuator assembly is provided, leading to a high degree of automation.

The starting point of the present disclosure is a shape-memory actuator assembly having a shape memory wire element, a first deflection body and a second deflection body, the first and second deflection bodies are spaced apart from each other. The shape memory wire element is wound around the first deflection body and the second deflection body several times leading to an actuator arrangement located between them, providing actuation when heated above the phase transition temperature.

According to the present disclosure, at least one wire holder on the respective deflection body and the sections of the shape-memory wire element contacting the wire holder are embedded in a casting compound. In the present context, the wire holder is understood to be the part of the deflection body on which the shape-memory wire element is laid during the winding process. The application of the casting compound makes it possible to improve the automation of the assembly, wherein in a first step the shape-memory wire element is guided preferably by means of a winding machine several times around the first deflection body and the second deflection body, which are initially located in a clamping fixture. As a second step, the casting is conducted in the vicinity of the deflection bodies to secure the wire arrangement thereon.

In addition to improved manageability, the casting compound, due to its elasticity, leads to a reduction in the notch effect on the shape memory wire element in the vicinity of the deflection bodies, resulting in a shape-memory actuator assembly with a long service life. For a preferred embodiment, a wire holder with groove-shaped wire receptacles is further provided on each deflection body to facilitate uniform wire placement.

For an advantageous further design of the shape-memory actuator assembly, a casting pot is assigned to each one of the first deflection body and the second deflection body. This allows the wire-wrapped deflection bodies, resulting from the first assembly step, to be inserted into a castable mold, which forms a lost formwork. Particularly preferably, the material of the casting compound is selected such that by the casting process the deflection body is mechanically coupled to the respective associated casting pot so securely that complete transmission of the actuator forces via the casting compound is possible. For this purpose, a composite resin can be used as the casting compound. Furthermore, it is preferred that the casting compound completely encloses the respective deflection body to achieve a particularly good mechanical connection between the deflection body and the casting pot. For an advantageous embodiment, fastening elements are additionally provided on the casting pot to transmit actuator forces.

For a preferred embodiment of the shape-memory actuator assembly, a clamping piece is attached to the deflection body after the first assembly step and before the casting compound is applied, wherein the clamping piece serves to secure the wire arrangement for transfer. For this purpose, a clamping piece in the form of a clip is used that positionally fixes the sections of the shape memory wire element contacting the wire holder. After the clamping pieces have been attached to the deflection bodies, they can be removed from the winding machine and the wound deflection bodies can be placed upright in a casting pot, which is subsequently filled with the casting compound. The casting is preferably carried out such that the entire clamping piece with the deflection body is completely embedded in the casting compound.

As an alternative to the clamping piece, an adhesive layer can be applied to the wire holder and/or the shape memory wire element to enable intermediate fixation of the winding arrangement. In particular, an adhesive that can be activated by melting can be used, so that the gluing is achieved specifically at the contact points of the shape memory wire element on the wire holder of the deflection body, especially due to heating by means of an electrical current.

By using the casting compound, a shape memory actuator assembly is realized for which additional mechanical securing of the wire ends can be dispensed with. In particular, there is no need to secure each wire wrap individually. Nevertheless, there is the possibility of additionally securing the shape memory wire element to the first deflection body and/or to the second deflection body by means of redundant securing by a frictional connection and/or a form fit and/or an adhesive bond. This can be done, for example, by laser welding. Alternatively, the end section of the shape memory wire element can be guided several times around the deflection body or it is introduced under tension into a groove recess with undersize compared to the wire diameter. Furthermore, it is conceivable to realize the redundant securing of the end section by gluing or crimping.

For a further development, after wrapping the deflector bodies with the shape memory wire element and before casting, a compensation of the differing wire tension is carried out. For this purpose, the distance between the deflection bodies can be increased via the clamping device so that tension is created in the clamping fixture. Alternatively, an electrical current is applied to activate the shape memory wire element. Both measures lead to length compensating movements of the wire wrapping disposed on the deflection bodies, resulting in actuators that could act in unison.

For a preferred embodiment of the shape memory actuator assembly, the mechanically parallel-working actuators between the deflection bodies are controlled by a serial current supply to simplify the driver circuit. This requires that the individual actuators are electrically isolated from each other, wherein a higher total electrical resistance compared to parallel activation results. Therefore, a design with a wire holder forming an electrical insulator and an electrically non-conductive casting compound is preferred. For embodiments with intermediate securing of the wrapping on the deflection body, the clamping piece used for this purpose has to be electrically insulating as well.

For a further embodiment, at least a portion of the actuator arrangement is embedded in an actuator casting element located between the first deflection body and the second deflection body. This measure simplifies the handling of the shape-memory actuator assembly, since there are no loose wires and mutual wire contact is prevented during operation. This is particularly advantageous for a design, applying serial energizing. Furthermore, embedding the actuator arrangement in an actuator casting element ensures improved heat dissipation in cyclic operation, so that the time span for cooling is significantly reduced and thus the switching frequency can be increased. The material selected for the actuator casting element is preferably electrically insulating and has to have sufficient elasticity so that the actuator function is not significantly affected. An actuator casting element made of silicone (polysiloxane) has proved to be advantageous.

For one possible embodiment, the actuator casting element and the casting compound in the vicinity of the deflection bodies are produced separately, wherein different materials can be applied. Preferably, the actuator casting element and the casting compound are joined by a material bond so that there are no free spaces surrounding the shape memory wire element. Also conceivable is a design applying the same type of material for the actuator casting element and the casting compound or an integral casting step, filling a combined mold with a uniform material.

BRIEF DESCRIPTION OF THE DRAWINGS

The following description is provided with reference to embodiments and in connection with the accompanying figures, wherein.

DETAILED DESCRIPTION

Figure 1:
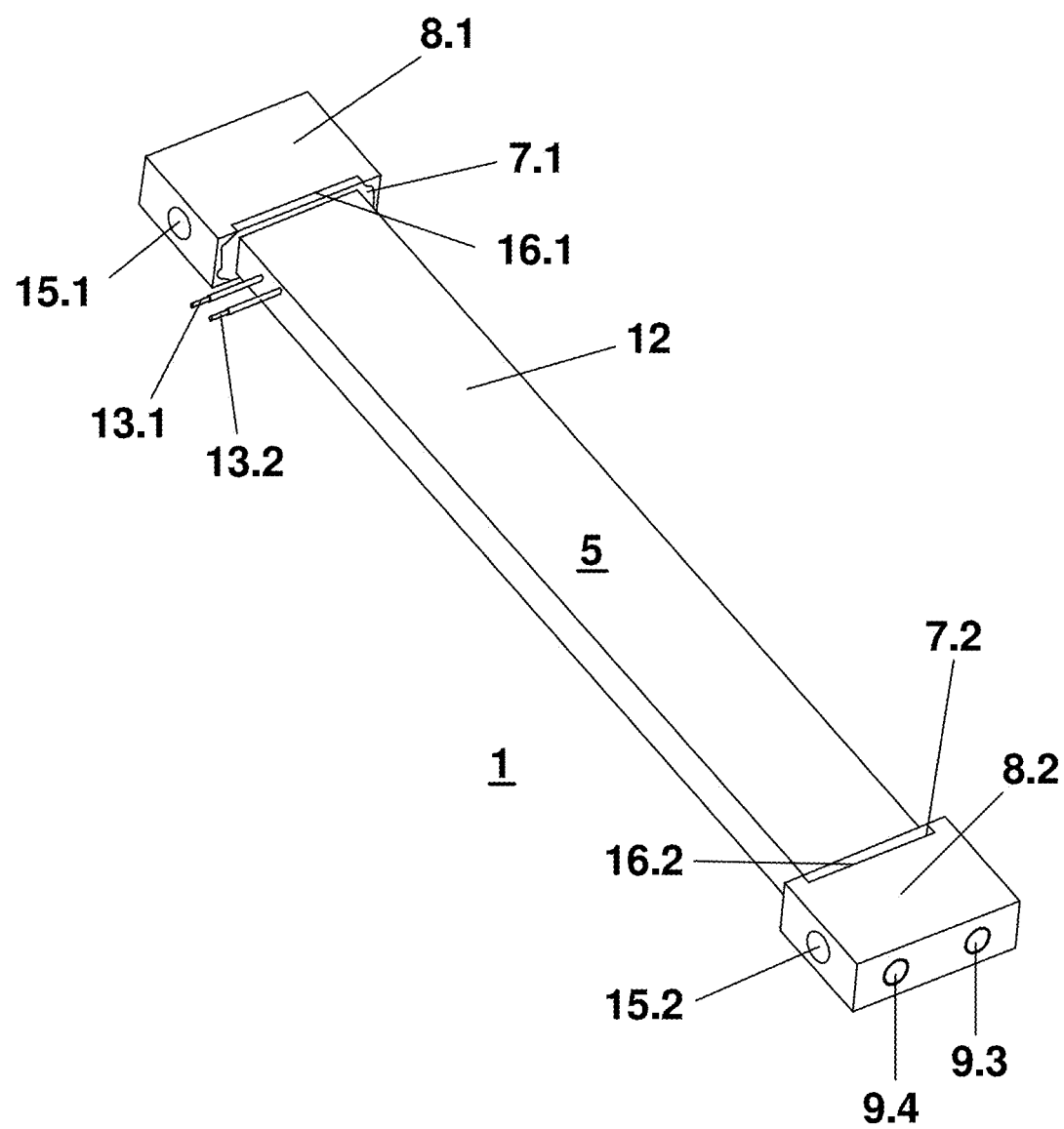
FIG. 1 shows a perspective view of a shape memory actuator assembly according to the present disclosure.
Figure 2:
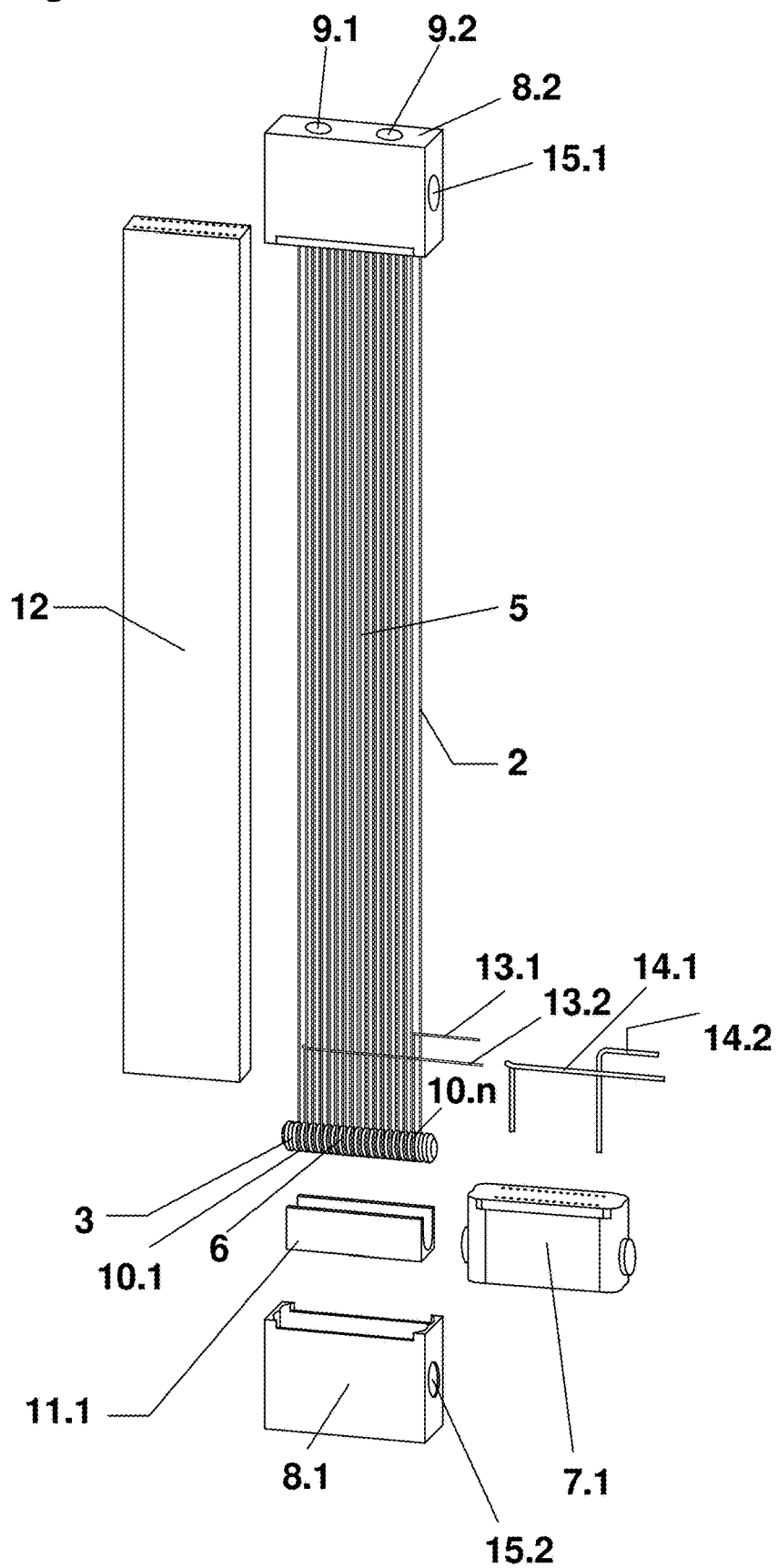
FIG. 2 shows an exploded view of the shape memory actuator assembly of FIG. 1.
Figure 3:
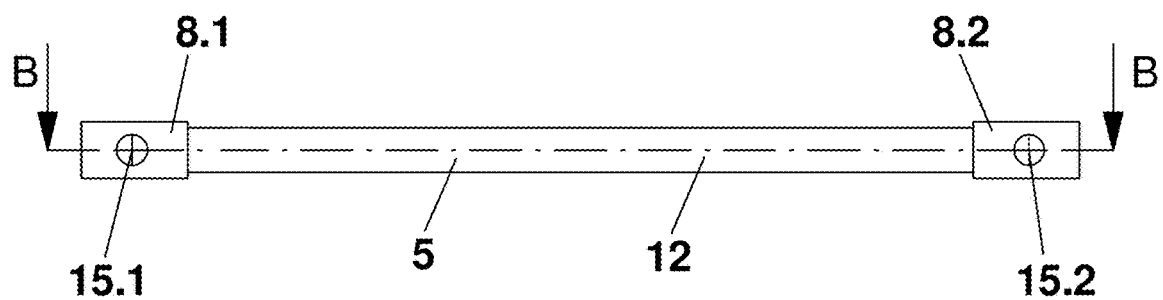
FIG. 3 shows a side view of the shape memory actuator assembly of FIG. 1.

FIG. 1 shows a schematically simplified perspective external view for a preferred embodiment of the shape-memory actuator assembly 1 according to the present disclosure. Depicted is an actuator casting element 12 made of silicone which, as illustrated by the exploded view in FIG. 2, encloses an actuator arrangement 5. As shown in FIG. 2, the actuator arrangement 5 is formed by wrapping a shape memory wire element 2 around an arrangement comprising a first deflection body 3 and a second deflection body 4, which are spaced apart from each other.

Figure 4:
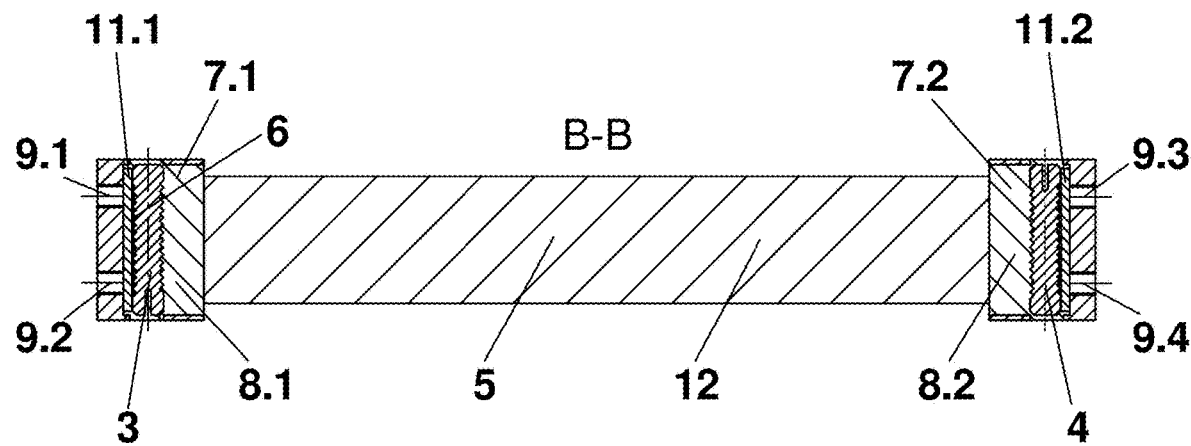
FIG. 4 shows the sectional view B-B of the shape memory actuator shape memory actuator assembly of FIG. 3.

The deflection bodies 3, 4, which can be seen in particular in FIG. 4, transmit the actuating forces of the actuator arrangement 5, generated by heating the shape memory wire element 2 above the phase transition temperature by means of an electric current.

For a preferred embodiment, the actuator arrangement 5 is energized serially so that the windings of the shape memory wire element 2 are not allowed to contact each other. This is ensured in the section between the deflection bodies 3, 4 by the actuator casting element 12, wherein it additionally dissipates heat from the actuator arrangement 5, thereby enabling fast cyclic operation of the shape-memory actuator assembly 1.

Furthermore, for a preferred embodiment, at least the wire holder 6 on the deflection bodies 3, 4 is designed as an electrical insulator. A ceramic hollow cylinder with groove-shaped wire receptacles 10.1, 10.2 on the outer surface is used, which serve to place the shape memory wire element 2 with defined lateral distances on the deflection bodies 3, 4 during the manufacture of the winding arrangement. Inside the ceramic hollow cylinder there is a metal pin as structural reinforcement, or the ceramic component forms a coating on a load-bearing metal component. Possible alternatives are an all-ceramic design of the deflection body 3, 4 or a design made of an insulating plastic, for example PEEK.

As shown in FIG. 2 and by the sectional view B-B shown in FIG. 4, in the assembled state of the shape-memory actuator assembly 1, a clamping piece 11.1, 11.2 is fitted on the wire holder 6 after the wrapping, which provides a fixation of the sections of the shape memory wire element 2 guided around the deflection bodies 3, 4. By this measure, the winding arrangement can be handled as a unit during assembly, which has to be placed in a mold for the casting step. According to the present disclosure, an embedding of at least the wire holder 6 on the respective deflection body 3, 4 and of the portions of the shape memory wire element 2, contacting the wire holder 6, in a casting compound 7.1, 7.2 is carried out. For the preferred embodiment shown in FIGS. 1-4, the casting pots 8.1, 8.2 associated with the deflection bodies 3, 4 serve as lost formwork of the casting step.

In particular FIGS. 2 and 4 depict that after the casting, the deflection bodies 3, 4 with the clamping pieces 11.1, 11.2 fitted thereon are completely enclosed by the casting compound 7.1, 7.2, preferably an electrically insulating composite resin or a two-component adhesive or a UV-curable polymer. This ensures that the sections of the shape memory wire element 2, contacting the wire holder 6, are positionally fixed. In addition, a mechanical coupling is created between the deflection bodies 3, 4 and the respective associated casting pot 8.1, 8.2, on which fastening elements 9.1-9.4 in the form of internal threads are arranged to transmit the actuator forces.

To ensure a sufficiently long electrical insulating distance, lateral recesses 15.1, 15.2 are arranged on the casting pots 8.1, 8.2 in the vicinity of the mounting position of the deflection bodies 3, 4, which are filled with the casting compound 7.1, 7.2. The millings 16.1, 16.2 at the edges of the casting pots 8.1, 8.2 serve the same purpose.

The electrical contacts 13.1, 13.2, which are formed by the sections of the shape memory wire element 2, covered with heat shrink tubing 14.1, 14.2 and extending out of the winding arrangement, supply electric current. Preferably, the electrical contacts 13.1, 13.2 extend from the casting pot 8.1, 8.2 into the actuator arrangement 5, so that even under the effect of the actuator forces, crushing against the walls of the casting pot 8.1, 8.2 can be reliably prevented. For a preferred embodiment, the force generated by the actuator arrangement 5 in the activated state is completely transmitted via the casting compound 7.1, 7.2 to the casting pot 8.1, 8.2. Furthermore, it is preferred to design the casting compound 7.1, 7.2 and the actuator casting element 12, enclosing the actuator arrangement 5, as being joined by a material bond.

Figure 5:
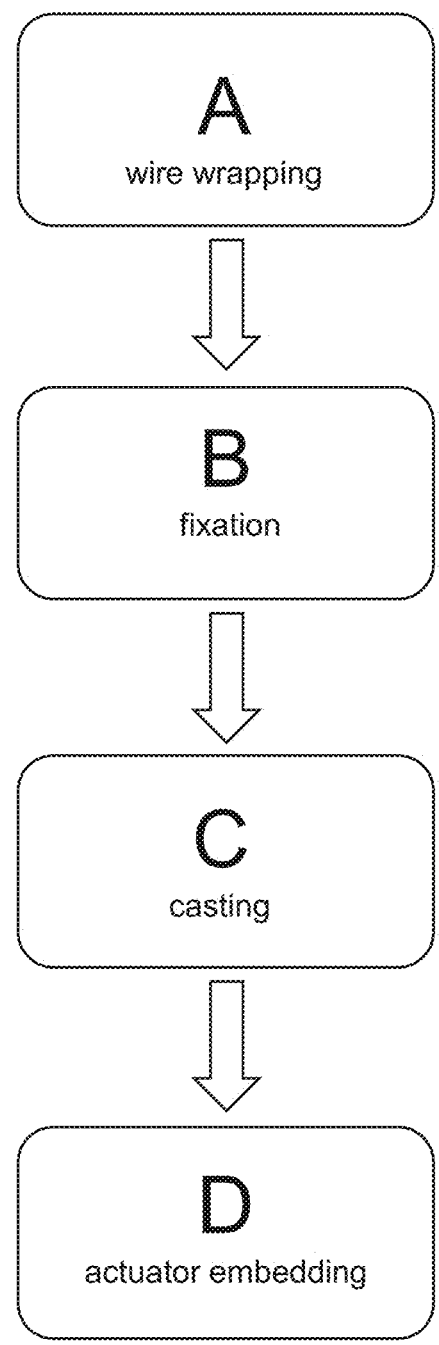
FIG. 5 shows a flow chart of the assembly method according to the present disclosure for manufacturing a shape memory actuator assembly.

FIG. 5 shows a flow chart of the assembly method according to the present disclosure for manufacturing a shape memory actuator assembly. Step A refers to the multiple wrapping of an arrangement comprising a first deflection body 3 and a second deflection body 4 with a shape memory wire element to form an actuator arrangement 5. Step B refers to the fitting of a clamping piece 11.1, 11.2 for the fixation of the sections of the shape memory wire element 2, contacting the wire holder 6 on the deflection bodies 3, 4. For step C, the winding arrangement thus secured in the vicinity of the deflector bodies 3, 4 is introduced into assigned casting pots 8.1, 8.2, which are filled with a casting compound 7.1, 7.2. Step D denotes the actuator embedding by transferring it into a second mold and the manufacturing of the actuator casting element 12 for the section providing the actuator arrangement 5.

Further modifications and embodiments according to the present disclosure will be apparent to those skilled in the art and from the following set of claims, without having to describe or show same herein and without departing the scope of the claims.

LIST OF REFERENCE NUMERALS 1 shape-memory actuator assembly
2 shape-memory wire element
3 first deflection body
4 second deflection body
5 actuator arrangement
6 wire holder
7.1, 7.2 casting compound
8.1, 8.2 casting pot
9.1, 9.2
9.3, 9.4 fastening element
10.1-10.n groove-shaped wire receptacle
11.1, 11.2 clamping piece
12 actuator casting element
13.1, 13.2 electrical contacting
14.1, 14.2 heat shrink tubing
15.1, 15.2 lateral recess
16.1, 16.2 milling The invnention claimed is:

1. A shape-memory actuator assembly, comprising:
a shape memory wire element;
a first deflection body and a second deflection body, spaced apart from each other,
wherein the shape memory wire element is wound around the first deflection body and the second deflection body several times and provides an actuator arrangement located between them;
wherein at least one wire holder on the respective deflection body, and sections of the shape memory wire element contacting the wire holder, are embedded in a casting compound.

2. The shape-memory actuator assembly of claim 1, wherein a casting pot is assigned to each one of the first deflection body and the second deflection body, and wherein the casting compound mechanically couples the respective deflection body with the respective casting pot to transmit actuator forces.

3. The shape-memory actuator assembly of claim 2, wherein the casting pot comprises a fastening element for transmitting actuator forces.

4. The shape-memory actuator assembly of claim 1, wherein the casting compound is electrically insulating.

5. The shape-memory actuator assembly of claim 1, wherein the casting compound comprises a composite resin, a two-component adhesive or a UV-curable polymer.

6. The shape-memory actuator assembly of claim 1, wherein the casting compound completely encloses the respective deflection body.

7. The shape-memory actuator assembly of claim 1, wherein the wire holder is an electrical insulator.

8. The shape-memory actuator of claim 7, wherein the wire holder comprises groove-shaped wire receptacles.

9. The shape-memory actuator of claim 1, wherein a clamping piece embedded in the casting compound is arranged at each one of the first deflection body and the second deflection body, and wherein the clamping piece is designed for fixation of the sections of the shape memory wire element contacting the wire holder.

10. The shape-memory actuator assembly of claim 9, wherein the clamping piece is an electrical insulator.

11. The shape-memory actuator assembly of claim 1, wherein an end piece of the shape memory wire element is connected to the first deflection body or the second deflection body by a frictional connection, a form fit and/or an adhesive bond.

12. The shape-memory actuator assembly of claim 1, wherein at least a portion of the actuator arrangement between the first deflection body and the second deflection body is embedded in an actuator casting element.

13. The shape-memory actuator assembly of claim 12, wherein the actuator casting element and the casting compound are joined by a material bond.

14. An assembly method for manufacturing a shape-memory actuator assembly, comprising the steps of:
multiple wrapping of an arrangement comprising a first deflection body and a second deflection body, which are spaced apart from each other, with a shape memory wire element to form an actuator arrangement; and
embedding at least one wire holder on the respective deflection body, and sections of the shape memory wire element contacting the wire holder, in a casting compound.

15. The assembly method of claim 14, wherein the embedding in the casting compound is conducted such that the deflection body is completely enclosed by the casting compound.

16. The assembly method of claim 14, wherein the first deflection body and the second deflection body, after being wrapped with the shape memory wire element, are each introduced into an associated casting pot, which is filled with the casting compound, and wherein the casting compound mechanically couples the deflection body to the associated casting pot for transmitting actuator forces.

17. The assembly method of claim 14, wherein a clamping piece for fixation of the sections of the shape memory wire element contacting the wire holder is placed on the first deflection body and the second deflection body after the shape memory wire element has been wrapped around them and before they are embedded in the casting compound.

18. The assembly method of claim 14, wherein at least a part of the actuator arrangement between the first deflection body and the second deflection body is embedded in an actuator casting element.

19. The assembly method of claim 18, wherein the actuator casting element and the casting compound are joined by a material bond.

20. The assembly method of claim 19, wherein the actuator casting element and the casting compound are produced in an integral casting step, wherein a combined mold is filled with a uniform material.

* * * * *